(12) United States Patent
Wu et al.

(10) Patent No.: US 8,040,836 B2
(45) Date of Patent: Oct. 18, 2011

(54) LOCAL NETWORK CODING FOR WIRELESS NETWORKS

(75) Inventors: Yunnan Wu, Redmond, WA (US); Jitendra D. Padhye, Kirkland, WA (US); Ranveer Chandra, Kirkland, WA (US); Venkata N. Padmanabhan, Sammamish, WA (US); Philip A. Chou, Bellevue, WA (US); Mohamed Jawad Khaki, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1068 days.

(21) Appl. No.: 11/420,616

(22) Filed: May 26, 2006

(65) Prior Publication Data

US 2007/0274324 A1   Nov. 29, 2007

(51) Int. Cl.
H04B 7/212 (2006.01)
(52) U.S. Cl. .................................... 370/328; 370/255
(58) Field of Classification Search .................. 370/338, 370/310, 328, 315, 325
See application file for complete search history.

(56) References Cited

U.S. PATENT DOCUMENTS

| | | | |
|---|---|---|---|
| 5,926,101 A | 7/1999 | Dasgupta | |
| 6,046,978 A | 4/2000 | Melnik | |
| 6,757,738 B1 | 6/2004 | Cao et al. | |
| 6,778,518 B2 | 8/2004 | Jesse et al. | |
| 6,798,765 B2 | 9/2004 | Larsson | |
| 2003/0026268 A1* | 2/2003 | Navas | 370/400 |
| 2005/0010675 A1* | 1/2005 | Jaggi et al. | 709/232 |
| 2005/0013253 A1 | 1/2005 | Lindskog et al. | |
| 2005/0108368 A1* | 5/2005 | Mohan et al. | 709/220 |
| 2005/0152391 A1* | 7/2005 | Effros et al. | 370/432 |
| 2006/0098585 A1* | 5/2006 | Singh et al. | 370/252 |
| 2006/0245410 A1* | 11/2006 | Jiang | 370/346 |
| 2007/0094181 A1 | 4/2007 | Tayebnejad et al. | |
| 2008/0002599 A1* | 1/2008 | Yau et al. | 370/310 |

FOREIGN PATENT DOCUMENTS

| | | |
|---|---|---|
| EP | 1610503 A1 | 12/2005 |
| WO | WO-2005099222 A1 | 10/2005 |
| WO | WO-2005109728 A1 | 11/2005 |

OTHER PUBLICATIONS

Beyond Routing An Algebraic Approach to Network Coding.pdf.*
Network Coding—An Instant Primer.pdf.*
Ahlswede et al., "Network Information Flow", 2000.*

(Continued)

*Primary Examiner* — Patrick Edouard
*Assistant Examiner* — Michael Irace
(74) *Attorney, Agent, or Firm* — Lyon & Harr, L.L.P.; Craig S. Fischer

(57) ABSTRACT

A local network coding framework and method including techniques to improve efficiency in a wireless network by reducing overhead. The local network coding method includes exchanging data availability between nodes on the wireless network by sending Bloom filters of lists of packets to neighboring nodes. Based on data availability, optimized mixing of pure packets is performed to form mixture packets for output. A separate acknowledgement buffer keeps track of the pure packets transmitted but not acknowledged. If an acknowledgement does not arrive after a certain time period, the packet is assumed to be lost and is retransmitted. An optimized packet mixing process generates mixture packets and decides which nodes to send the mixture packets. The local network coding framework and method also includes methods for representing the composition of a mixture packet and using mixing at a wireless access point to improve the performance of the wireless local area network.

19 Claims, 6 Drawing Sheets

OTHER PUBLICATIONS

Wu et al., "Information Exchange in Wireless Network with Network Coding and Physical Layer Broadcast", Mar. 2005.*

Ahlswede et al., "Network Information Flow", 2000.*

Wu et al., "Information Exchange in Wireless Network with Network Coding and Physical Layer Broadcast", Mar. 2005.*

Ahuja, R. K., T. I. Magnanti, and J. B. Orlin, Some recent advances in network flows, SIAM Review, vol. 33, pp. 175-219, 1991.

Ahlswede, R., N. Cai, S. R. Li, and R. W. Yeung, Network information flow, Proc. of IEEE Transactions on Info. Theory, Jul. 2000, pp. 1204-1216, vol. IT-46, No. 4.

Biswas, S. and R. Morris, Opportunistic routing in multi-hop wireless networks, SIGCOMM Comput. Commun. Rev., 2004, pp. 69-74, vol. 34, No. 1.

Bloom, B., Space/time trade-offs in hash coding with allowable errors, Commun. ACM, Jul. 1970, pp. 422-426, vol. 13, No. 7.

Chazelle, B., J. Kilian, R. Rubinfeld, and A. Tal, The Bloomier filter: An efficient data structure for static support lookup tables, Proc. of the Fifteenth Annual ACM-SIAM Symposium on Discrete Algorithms (SODA), 2004, pp. 30-39.

Chou, C., A. Misra, Low latency multimedia broadcast in multi-rate wireless meshes, 1st IEEE Workshop on Wireless Mesh Networks, 2005, pp. 54-63.

Herhold, P., E. Zimmermann, G. Fettweis, Cooperative multi-hop transmission in wireless networks, Computer Networks, 2005, vol. 49, No. 3, pp. 299-324.

Herhold, P., E. Zimmerman, and G. Fettweis, Relaying and cooperation—A system perspective. Technische Universität Dresden, Vodafone Chair Mobile Comm. Sys., D-01062 Dresden, Germany.

Ho, T., M. Médard, R. Koetter, D. R. Karger, M. Effros, J. Shi and B. Leong, Toward a random operation of networks, IEEE Trans. Inform. Theory, 2004 submitted.

Katti, S., D. Katabi, W. Hu, H. S. Rahul, and M. Médard, The importance of being opportunistic: Practical network coding for wireless environments, Proc. 43rd Annual Allerton Conf. on Comm., Control, and Computing, 2005.

Koetter, R., and M. Médard, An algebraic approach to network coding, IEEE/ACM Trans. Networking, Oct. 2003., pp. 782-795, vol. 11, No. 5.

Lee, S.-J., M. Gerla, and C.-C. Chiang, On-demand multicast routing protocol, Proc. IEEE Wireless Communications and Networking Conference (WCNC'99), Sep. 1999, pp. 1298-1302, New Orleans, Louisiana, U.S.A.

Mitzenmacher, M., Compressed bloom filters, IEEE/ACM Transactions on Networking, 2002, vol. 10, No. 5, pp. 604-612.

Wu, Y., P. A. Chou, and S.-Y. Kung, Information exchange in wireless networks with netwrok coding and physical-layer broadcast, Proc. 39th Annual Conf. on Info. Sciences and Sys. (CISS), Mar. 2005.

* cited by examiner

| Field \ Neighbor | Has | Want |
|---|---|---|
| A | $x_1, x_3$ | $x_4$ |
| B | $x_1, x_4$ | $x_3$ |
| C | $x_1, x_3, x_4$ | $x_2, x_5$ |
| D | $x_1, x_5$ | $x_2$ |

FIG. 2

LOCAL NETWORK CODING FOR WIRELESS NETWORKS

BACKGROUND

Network coding allows a node in a network to generate output data by mixing (or computing certain functions of) its received data. This extends the conventional routing scheme that only allows a node to forward its received data. The broadcast property of the wireless medium renders network coding particularly useful for wireless networks. For instance, a single broadcast transmission on a wireless network of a proper mixture packet may simultaneously present useful information to multiple wireless nodes.

By way of example, FIG. 1 illustrates the general concept of network coding in a wireless network 100. The network 100 includes wireless node A, wireless node R, and wireless node B, where node A and node B are both within the wireless communication range of node R. As can be seen from FIG. 1, node A has packet $x_1$, node B has packet $x_2$, and node R has packets $x_1$ and $x_2$. Assume that node A needs packet $x_2$ and node B needs packet $x_1$.

One technique of supplying $x_1$ and $x_2$ to node A and node B is called traditional piggybacking. Traditional piggybacking concatenates packets such that, for example, in FIG. 1, $x_1$ and $x_2$ are combined to obtain a mixture packet that is the size of $x_1$ added to $x_2$. The disadvantage of traditional piggybacking is that the size of the mixture packet increases rapidly as more packets are added. One recent approach called physical piggybacking represents an improvement over traditional piggybacking. Physical piggybacking combines, for example, two packets into one packet without increasing the size of the packet. This means that the size of the resultant mixture packet is no greater that the largest packet being added together. This is achieved in part by using XOR operations. Referring to FIG. 1, physical piggybacking means that a single transmission of a mixture packet $x_1+x_2$ (where '+' stands for the bit-wise XOR of the two packets) by node R will simultaneously present $x_2$ to node A and $x_1$ to node B. Since node A already has $x_1$ it can compute $x_2$ by subtracting $x_1$ from the received mixture packet $x_1+x_2$. Similarly node B can compute packet $x_1$. This is an example of a single transmission that fulfills two tasks.

In order to implement this in practice, node R needs to have some way of knowing that node A has $x_1$ and node B has $x_2$. A recent wireless network coding framework takes advantage of physical piggybacking to improve the efficiency of unicasting in multi-hop wireless networks. In this approach, each node snoops on the medium and buffers whatever packets that it hears. A node also informs its neighbors which packets they have overheard. This allows nodes to have some knowledge of what packets are available at each neighboring node. Based on this knowledge, each node then determines whether there are opportunities to do mixing. Using the example of FIG. 1, node A may have overheard $x_1$ when some other node transmitted $x_1$ to node R. Node A then can explicitly tell node R that it has $x_1$, thereby allowing node R to detect the mixing opportunity. Thus, in the general sense, this type of network coding scheme is a data-driven framework consisting of two essential modules: data availability distribution and data distribution. The former enables a node to obtain an approximate view of the data each of its neighbors has (i.e., "who has what?"), which is used to guide the actual distribution of data.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The local network coding framework and method disclosed herein includes techniques that can improve the communication efficiency in a wireless network (especially a multi-hop wireless network) by reducing overhead and improving efficiency. In the exchange of data availability, Bloom filters of lists of packets are sent to neighboring nodes. The Bloom filters received within a certain amount of time are used to infer whether the sender of the Bloom filter has the packet in its possession. In addition, a separate acknowledgement buffer is used to keep track of the pure packets that are transmitted but not acknowledged. If an acknowledgement does not arrive after a certain time period, the packet is assumed to be lost and is retransmitted. This enhances the reliability of the packet delivery process.

Once the data availability of local node has been determined, an optimized packet mixing process is used to generate mixture packets and decide to which nodes to send the mixture packets. The composition of the mixture packet is determined using a two-step procedure: (1) select a set of pure packets to be mixed and a set of intended receivers; and (2) decide the mixing coefficients. For the first step, an optional preprocessing step includes identifying a set of candidate pure packets for the purpose of in-order delivery of packets belonging to the same transmission control protocol (TCP) flow. A packet is regarded as a candidate if there does not exist another pending outgoing packet that is an earlier packet in the same TCP flow. The selection of packets to be mixed may be performed by (i) enumerating the receiver sets, (ii) for each receiver set, optimizing the selection of pure packets, and (iii) retaining the best solution. For some embodiments, the enumeration of receiver sets is in an order such that a receiver set is considered only if all its subsets have been considered.

In step (ii), for a given receiver set, the selection of pure packets can be done using at least three techniques. In a first technique, for a given receiver set, the packets to be mixed are selected by first selecting one or more packets (for example, by maximizing a per-packet utility function) for each receiver and then taking the union. In a second technique, for a given receiver set, the packets to be mixed are selected by starting with an initial set, and then adding a packet whose addition leads to the largest increase of a function. When the function value cannot be increased further, no further packets are added. A third technique selects packets to be mixed by starting with an initial set, and at each step removing a packet whose removal leads to the largest increase of a function. Again, when the function value cannot be increased further, no further packets are removed.

For the second step, once a given set of pure packets to be mixed and a receiver set are found, then the mixing coefficients are determined. If a packet is wanted by only one receiver in the receiver set, then the mixing coefficient is set to one. Otherwise, the mixing coefficient is set to a randomly-chosen element of the set of nonzero elements of a finite field.

The local network coding framework and method also includes methods for representing the composition of a mixture packet in order to potentially reduce the overhead. One method includes recording hashes of the identifiers of pure packets that were combined to form a mixture packet, instead of the original identifiers. Another method includes recording a Bloom filter of the pure packets that were combined to form the mixture packet, when the combining operation is limited to XOR. Another method includes representing a linear mixture of a packet over a finite field by the number of packets being mixed, the Bloom filter of the packets being mixed, and the mixing coefficients which are arranged in some ordering based on the packets. In addition, after de-mixing, the integrity of the de-mixed packet can be checked by verifying the checksum of a de-mixed packet.

The local network coding framework and method also includes using mixing at a wireless access point to improve the performance of the wireless local area network.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

FIG. 2 is an example of a table representing the knowledge of local data availability and the set of pending outgoing packets used by the local network coding method.

DETAILED DESCRIPTION

In the following description of the local network coding framework and method, reference is made to the accompanying drawings, which form a part thereof, and in which is shown by way of illustration a specific example whereby the local network coding framework and method may be practiced. It is to be understood that other embodiments may be utilized and structural changes may be made without departing from the scope of the claimed subject matter.

I. General Overview

Figure 1:
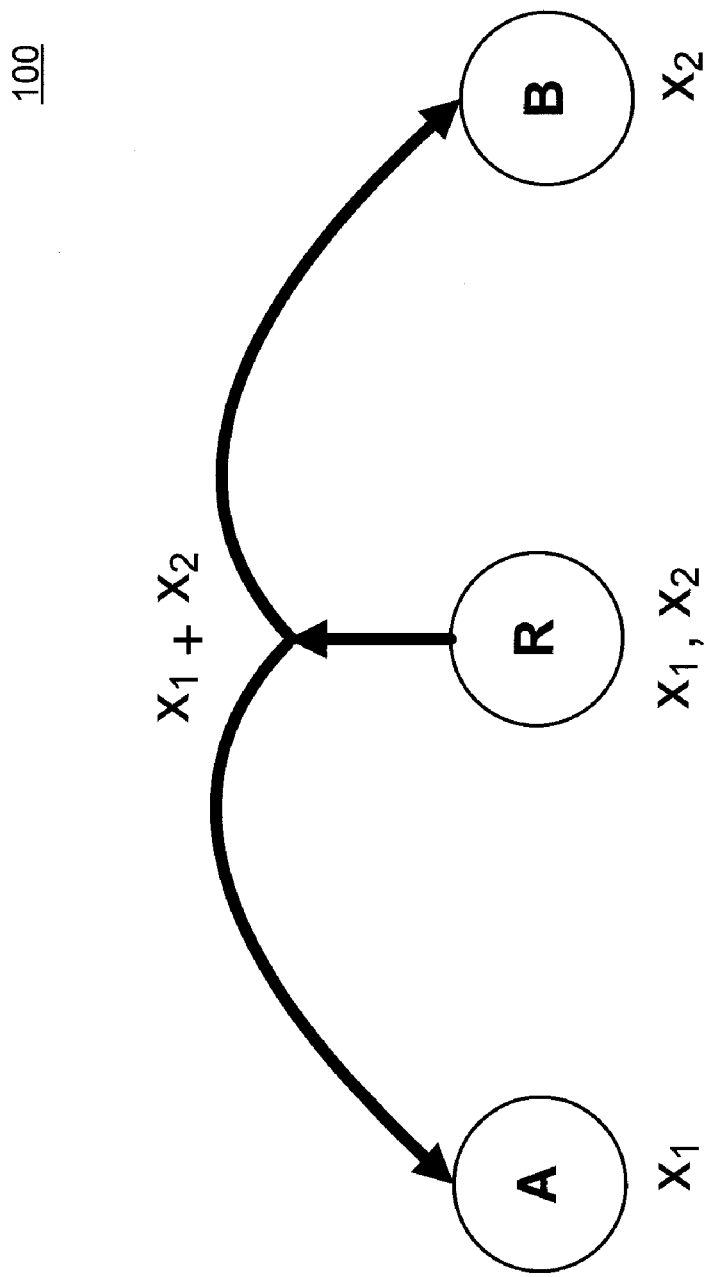
FIG. 1 illustrates the general concept of network coding in a wireless network.

In the example of FIG. 1, the packets $x_1$ and $x_2$ are mixed together as $x_1+x_2$, where the "+" represents a bit-wise XOR of the two packets. A more general class of mixing operations is considered herein, namely, a linear coding over a finite field F Each element of the finite field, which is called a symbol, can be represented by a certain number of bits. Therefore, each packet can be regarded as a vector of symbols. Therefore, a mixing of packets $x_1, \ldots, x_k$ could in general produce $$\sum_{i=1}^{k} \alpha_i x_i,$$

where $\alpha_i \epsilon F$, and the multiplication and addition operations are defined in F. The connotation "pure packet" is used to refer to a packet that was not generated by a mixing operation. A "mixture packet" includes a packet that is created through a mixing operation. In this sense, a pure packet is regarded as a degenerate mixture packet.

In the local network coding framework, each node listens to the medium and tries to receive packets. Each node also buffers each of the packets that it receives. In general, the local network coding framework maintains two buffers. One buffer holds mixture packets and another buffer holds pure packets. Because each packet is a linear combination of pure packets, the contents in the buffer can be viewed as a system of linear equations in terms of the pure packets. Upon receiving a packet $$\sum_{i=1}^{k} \alpha_i x_i,$$

the packet is put into the buffer and Gaussian elimination is applied to the buffered packets to recover new pure packets if possible. In this manner a node can recover from the received mixture packet the pure packet that the mode is missing.

Each node periodically announces (via broadcasts) to its neighbors a list of some pure packets in the buffer. Such announcements collectively allow a node to approximately know the data availability in the neighborhood. Using the example of FIG. 1, assume that node R is the node in consideration. FIG. 2 is an example of a table representing the knowledge of local data availability and the set of pending outgoing packets. In particular, FIG. 2 illustrates node R's knowledge about the data availability. In this example, nodes A, B, C, D, are the four neighbors of node R. For each neighbor node N, N.Has denotes the set of packets that node R infers that neighbor node N has in its possession. In addition, FIG. 2 illustrates a column that reflects the set of pending outgoing packets. Referring to FIG. 2, for each neighbor node N, N.Want denotes the set of packets that node R needs to send to neighboring node N.

Based on a table (such as illustrated in FIG. 2) and using the local network coding method outlined below, a node decides how to form output packets and what transmission rates should be used, with the objective of most efficiently using the medium. After a mixture packet is formed, it is submitted to the wireless network adapter and sent out in the wireless channel. By way of example, suppose this mixture packet provides a pure packet $x_N$ to neighboring node N. After the mixture packet is sent, $x_N$ is moved into a separate buffer that contains packets that are transmitted but not acknowledged. Packets in this buffer are not considered for mixing. A transmitted packet intended for multiple receivers will be acknowledged by one receiver. In some embodiments, the rule is to address the mixture packet to the furthest receiver. In this case, the furthest receiver will acknowledge according to the medium access control layer protocol. If the acknowledgment does not arrive from the furthest receiver N*, then the packet is moved back to N*.Want. Otherwise, $x_{N^*}$ is removed from the buffer of transmitted but not acknowledged packets. The local exchange of "who has what" provides the missing acknowledgements for other receivers of the packet. If a neighbor node N indicates the absence of $x_N$ after a certain threshold period of time, or if node R did not hear an announcement from neighboring node N about the related time interval (the announcement is lost), then pure packet $x_N$ is moved back to N.Want. Otherwise, $x_N$ is removed from the buffer of transmitted but not acknowledged packets.

II. Operational Overview

Figure 3:
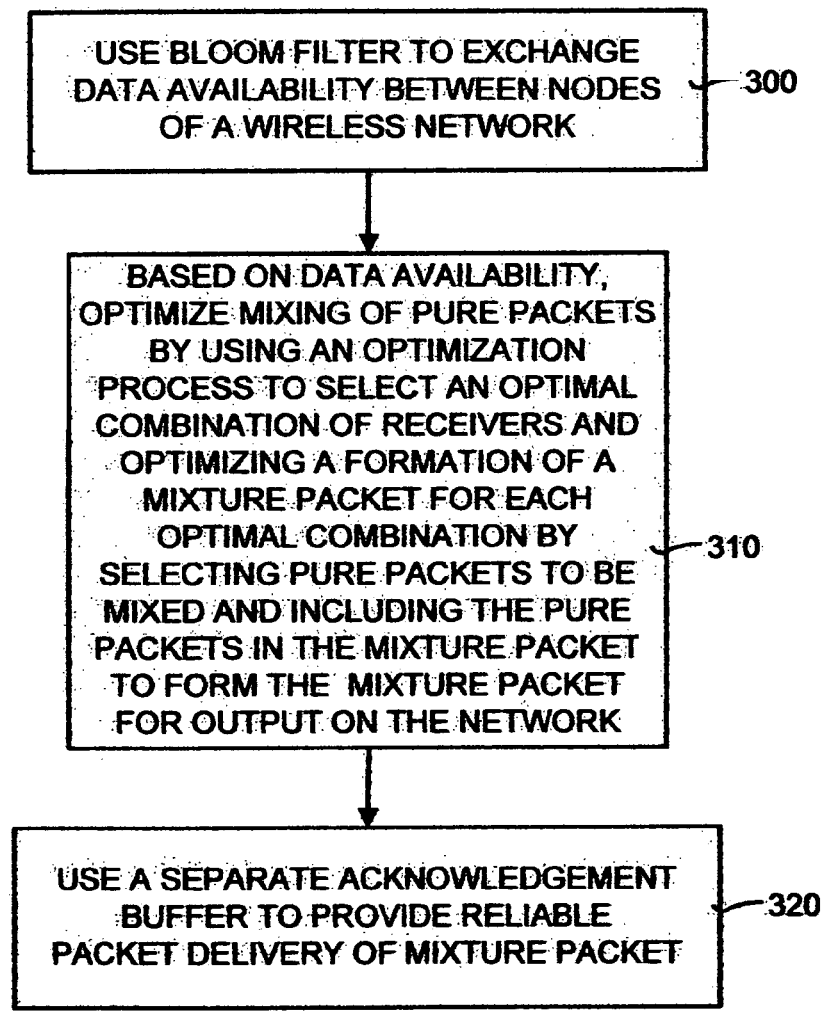
FIG. 3 is a general flow diagram illustrating the general operation of the local network coding method.

FIG. 3 is a general flow diagram illustrating the general operation of the local network coding method. In general, the local network coding method uses a variety of techniques to reduce overhead and increase efficiency of exchanging data availablity and mixing and delivering needed packets. More specifically, as shown in FIG. 3, the local network coding method uses a Bloom filter to exchange data availability between nodes of a wireless network (box 300). Bloom filters are an efficient way to represent sets, and are known in the art. In addition, in some embodiments hash functions also are used, as discussed in detail below.

Once the data availability of the local nodes is known, the local network coding method optimizes the mixing of pure packets (box 310). This mixing is based on the data availability. The optimized mixing of the pure packets creates a mixture packet that is ready for output on the wireless network. As discussed below, the variety of techniques used to optimize the packet mixing, including finding receiver sets which to send the mixture packet, finding the pure packets to send to each receiver in the receiver set, and determining mixing coefficients.

Once the mixture packet is generated by combining the necessary pure packets, it is ready for output on the wireless network. Support of reliable packet delivery is provided by the local network coding method by defining a separate acknowledgement buffer (box 320). The acknowledgement buffer contains packets that have been sent but not acknowledged by their intended recipients.

III. Exchange of Data Availability

One of the first steps to be performed in network coding is to let each node on the wireless network know which packets are in possession of each of their neighbors. This is another way of saying that it is determined locally which node has what. Once this exchange of data availability is performed, then it can be determined whether and what type of mixing can be done so that neighboring nodes can be given packets they need and perform de-mixing upon receipt. This exchange of data availability process serves at least two purposes. First, it facilitates identifying mixing opportunities, and, second, it provides reliability support by acknowledging any received packets.

Use of Bloom Filters and Hash Functions

Exchange of data availability by the local network coding method disclosed herein includes the use of Bloom filters and hash functions to exchange data availability between nodes. Use of the Bloom filters and hash functions reduces the overhead of letting others know who has what. In some embodiments, the exchange of data availability process also uses hash functions instead of the original packet identification (or "ID"). Using a hash function in place of a packet ID allows the packet to be represented with fewer bytes. By way of example, the original packet ID may be six bytes, but, by using a hash function, only two bytes are needed to represent the packet.

It should be noted that a node on the wireless network can obtain some partial information about its neighbors' data in a passive fashion, such that dedicated control packets are not used. For example, referring to FIG. 1, node R may infer that node A holds packet $x_1$ if node R recently received packet $x_1$ or a mixture packet involving $x_1$ from A, or if R recently heard A acknowledging the receipt of packet $x_1$. This type of passive inference does not incur any additional overhead. Using passive inference alone, however, affords a node a limited view of the neighbors' data availability. This can result in fewer mixing opportunities being identified.

To obtain additional information about local data availability, the exchange of data availability process has each node explicitly announce to its neighbors the packets it currently possesses. These data availability announcements are sent out periodically. By way of example, in some embodiments, these data availability announcements are sent out approximately once every 100 ms. The challenge in practically using this scheme lies in keeping the incurred overhead low. If the data availability announcement simply includes the identifier of each pure packet in the buffer, the overhead can be six bytes per packet, which is a significant size. Moreover, since the buffer content changes over time, the data availability announcement needs to be sent out periodically. This makes overhead reduction even more important.

To reduce the control overhead, the exchange of data availability process makes use of the aforementioned passive inference as much as possible and also uses Bloom filters to summarize the list of packet IDs. Bloom filters of lists of packets are sent to neighboring nodes for the purpose of exchanging data availability in the wireless network. The Bloom filter is known in the art and will not be discussed in further detail.

Each data availability announcement is the Bloom filter (or compressed Bloom filter) of a certain subset of pure packets held by a node. When constructing the Bloom filter, either the entire packet can be hashed or a certain unique identifier of the packet can be hashed. In some embodiments, each data availability announcement also has a validity period. As a result, at any instant, each node has a collection of Bloom filters sent by its neighbors that have not expired. Each node then enumerates its pending output packets to infer their availability at the neighbors. Specifically, for each pending output packet, a check is made as to whether the pending output packet is accepted by any Bloom filter from each neighbor. A set for each neighbor that represents the packets in possession of each neighbor then is created in this manner. In some embodiments, the checking process and the update of "who has what" information can be invoked each time a Bloom filter is received. In these embodiments, each "who has what" entry has an expiration time.

A general embodiment of the data availability announcement is as follows. A generic node (such as node R) sends out an announcement every time a checkpoint in time is reached, such that $t_1 < \ldots < t_k$ denote the times of the checkpoints. A new checkpoint is generated when either one of the following occurs: (1) a certain number of new packets have arrived since the last checkpoint; or (2) a certain time duration has passed since the last checkpoint. Each data availability announcement is sent as a broadcast packet. At time $t_i$, two (or other fixed number) data availability announcements are sent, the first announcement for packets received in $[t_{i-2}, t_{i-1})$ and the second announcement for packets received in $[t_{i-1}, t_i)$. The first announcement is included to guard against the loss event of a previous announcement packet. It should be noted that this is an optional step. In addition, the sequence number i of the checkpoint is also included in the data availability announcement packet. Each node only examines the announcements about intervals in the past $t_v$ seconds, where $t_v$ is a parameter representing the validity period.

In other embodiments, when composing data availability announcements, packets are excluded whose availability does not need to be announced. In this situation there can be two cases. In the first case, if the current node is not the intended receiver of a pure packet (which may occur if a node overheard this packet), and furthermore if it is inferred that the pure packet is less likely to be piggybacked (such as when a node has already heard the next hop of the packet transmitting a mixture involving this pure packet), then such a pure packet can be excluded. In the second case, if the current node is the intended receiver of a pure packet and the packet has already been acknowledged by the media access control (MAC) layer, then such a packet also can be excluded. The MAC layer is a sublayer of the data link layer (of the OSI model), which controls how a computer on the network gains access to the data and obtains permission to transmit the data.

Acknowledgement of Received Packets

The exchange of data availability process also provides reliability support by acknowledging any received packets. One problem with the existing 802.11 standard (the IEEE standard for wireless local area networks) is that only one node can be designated as the intended receiver. When sending to multiple receivers, only one receiver can acknowledge in the MAC layer. For example, referring to FIG. 1, assume that node R transmits the mixture packet $x_1$ XOR $x_2$ to both node A and node B, and that node A is designated as the intended receiver. In this case, an acknowledgement will be received from node A (assuming that node A receives the mixture packet), but there will be no acknowledgement from node B. The exchange of data availability process provides a way whereby node B can notify node R that node B has received packet $x_2$. Otherwise, there is no feedback to verify that node B actually received packet $x_2$.

In general, reliability support is achieved by keeping track of the pure packets that are transmitted but not acknowledged, and retransmitting pure packets which are inferred to be lost or for which an acknowledgment does not arrive after a certain time period. Both the first transmission and any retransmission are handled in a similar fashion. This means that a pure packet to be retransmitted can also be mixed with other packets.

More specifically, in some embodiments a separate buffer is used to keep track of packets transmitted but not acknowledged. This separate buffer can be called an acknowledgement buffer. The purpose of this separate acknowledgement buffer is to hold packets that have been sent but are waiting for acknowledgement. Once it is acknowledged that a node has received the packet, then the packet is removed from the acknowledgement buffer. Using the previous example, once node A acknowledges that it has received packet $x_2$, then packet $x_2$ is removed from the acknowledgement buffer.

If somehow the acknowledgement does not arrive after a certain time, then the packet in the buffer is retransmitted. In some embodiments, this certain time for acknowledgement is approximately 300 ms. This enhances the reliability of packet delivery. The acknowledgement buffer works together with the Bloom filter to provide reliable packet delivery and, if necessary, retransmission of packets.

IV. Optimized Packet Mixing of Mixture Packet

Once the exchange of data availability is performed, one of the next steps of the local network coding is to optimize the mixing of a mixture packet that will be distributed over the network. The general idea is to send all the pending output packets while using the least amount of network resource. The optimized packet mixing process disclosed herein includes a two-step procedure. Generally, the first step is to select a set of pure packets to be mixed along with an associated set of intended receivers. The second step then is to decide the mixing coefficients. An optional preprocessing first will be discussed, and then each of two above-mentioned steps will be discussed in further detail.

Preprocessing: Identifying Candidate Packets in a TCP Flow

The following optional preprocessing is used in some embodiments to ensure that transmitted packets are delivered in order when using transmission control protocol (TCP). One reason for this preprocessing is to ensure that packets belonging to the same TCP flow are transmitted in order, thereby avoiding out-of-order delivery. TCP interprets out-of-order packet arrivals as congestion signals and reduces the sending rate accordingly. Thus, it is desirable to ensure the in-order delivery of packets belonging to the same TCP flow. This preprocessing is optional, and when using another protocol other than TCP (such as user datagram protocol (UDP)), this out-of-order reception is less of an issue and preprocessing may not be necessary.

This preprocessing step initially identifies a set of candidate pure packets for the purpose of in-order delivery of packets belonging to the same TCP flow. Specifically, in some embodiments each packet in an output queue of current node is examined. Next, a subset of packets from this queue are selected as candidate packets. A packet is regarded as a candidate if there does not exist another pending outgoing packet that is (or estimated to be potentially) an earlier packet. In other words, if there is no other pending outgoing packet having a lower sequence number in the same TCP flow as the packet. By way of example, if for a certain TCP flow there are two packets in the output queue, then the second packet having a lower sequence number than the first packet is not eligible for mixing unless the first packet is selected. In this manner, the preprocessing identifies a subset of packets from the output queue as the candidate packets to be mixed and ensures in-order delivery of TCP packets.

Selection of Packets to be Mixed with an Associated Set of Intended Receivers

Deciding which set of packet to mix to obtain a mixture packet is one of the steps of optimized packet mixing process. Essentially, this step determines which packets to mix and to which nodes that the mixture packet should be sent. In general, the optimized packet mixing process enumerates the receiver sets, optimizes the formation of a single mixture packet for each receiver set, and then retains the best solution. Each of these processes will now be discussed.

Figure 4:
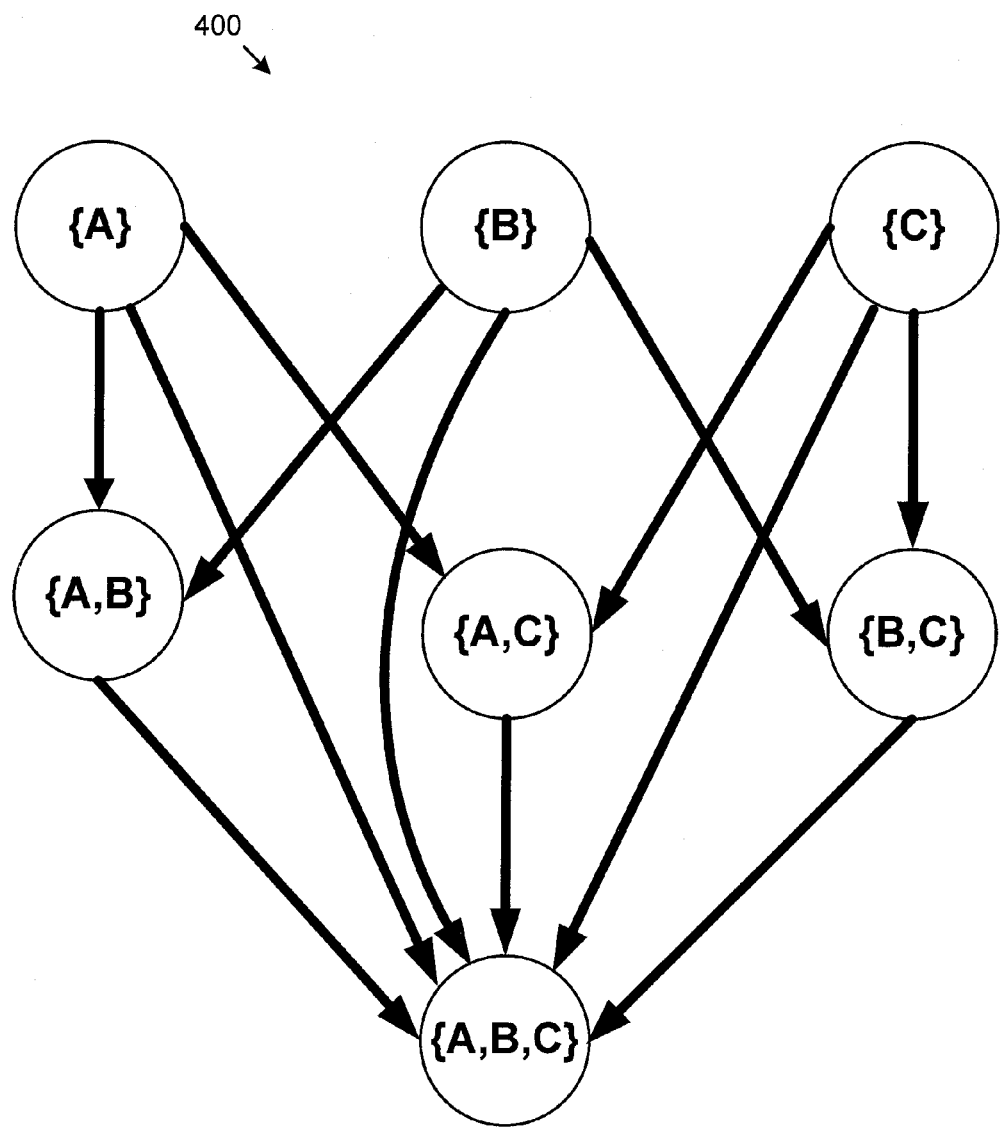
FIG. 4 illustrates a graph of each of the possible receiver sets and their subset-superset relations.

A receiver set is a subset of neighbors for which each transmitted packet is intended. In some embodiments, each of the possible combinations of receiver sets is examined in a certain order. In other embodiments, only a subset of the possible receivers set is enumerated. Some embodiment use an order such that a receiver set is considered only if all its subsets have been considered. For example, if a node has three neighbors, nodes A, B, C, then there are $2^3-1=7$ possible receiver sets. FIG. 4 illustrates a graph 400 of each of the possible receiver sets and their subset-superset relations. Namely, as shown in FIG. 4, the possible receiver set combinations are $\{A\}, \{B\}, \{C\}, \{A,B\}, \{B,C\}, \{A,C\}, \{A,B,C\}$. The lines with arrows in FIG. 4 represent each associated subset of a particular receiver set.

Each of possible combination of receiver sets is examined, and the best combination is selected. In some embodiments, the list of receiver sets is pruned by considering whether there are any receivers to which the packets cannot be sent. If so, then that receiver is eliminated from the list of receiver sets. For each possible combination of receivers, packets are selected for inclusion into the outgoing mixture packet. The best combination of receiver sets and packets to include in the mixture packet for a particular combination then is determined using an optimization process. In some embodiments, a utility function is optimized to determine the best packets to mix and the list of intended receivers. In an alternative embodiment, all combinations may not be exhausted, but a greedy packet process may be used, as discussed below. This alternative embodiment may be used when there are many possible receiver set combinations.

Given a receiver set, the optimized packet mixing process uses one of three methods to select the pure packets that will be part of a mixture packet sent to receivers in the receiver set. The first method is to select one packet for each receiver in the set and take the union of the selected packets. In some embodiments, the single packet from each receiver is selected by taking the packet having the largest per packet utility. This method works well for in many situations, especially in unicast cases, where the packet is wanted by a single node.

A second method is an iterative addition (or greedy addition) process. The method begins with an empty set of packets and at each step adds a pure packet whose addition leads to the largest increase of a certain utility function. The utility function represents a utility per second. The packet addition process continues until the function can no longer be increased, and is terminated when the function value cannot be increased. This method is useful, by way of example, when there are multicast packets, such that more than one node wants the same packet. In some embodiments, the function for a receiver set and a set of packets is defined as the sum of individual utility functions for each receiver in the receiver set divided by the expected transmission time of the mixture packet.

A third method, which is a variation of the second method, is an iterative removal (or greedy removal) process. This method starts with an initial set, and at each step removes a single packet. The packet removed is the packet whose removal leads to the largest increase of a certain utility function, up to where the function cannot be increased.

Determination of Mixing Coefficients

Deciding the optimal mixing coefficients for each of the selected packets is a next step in the optimized packet mixing process. Essentially, the coefficients to be placed in front of each selected packet are determined. For example, suppose that packets $x_1$, $x_2$, and $x_3$ have been selected for mixing. A rule is needed to decide how to mix them. In some embodiments, the rule is to use a linear combination of the selected packets. If a packet (such as $x_1$ in the example) is wanted by only one receiver in the receiver set, then the mixing coefficient is set to one. A packet that is wanted by only one receiver is a fairly common scenario, and is known as a unicast packet. Using the example above, if all the packets $x_1$, $x_2$, and $x_3$ are wanted by only one receiver, then using the above rule the mixture packets is ($x_1$ XOR $x_2$ XOR $x_3$).

In other embodiments, the packet may be wanted by multiple receivers. In this case, the mixing coefficients are determined by randomly selecting a non-zero element from a certain finite field. For example, if the finite field has four elements, then a coefficient of 1, 2, or 3 is equally likely, and is randomly selected.

V. Composition of a Mixture Packet

A mixture packet should contain some metadata so that a receiver of the packet recognizes the mixture packet's composition. One technique is to use the IP address and the IP sequence number of the source node as a unique identifier of each pure packet. For internet protocol, version 4 (IPv4), the length of such identifier is 4+2=6 bytes. For a mixture packet with payload $\Sigma_i \alpha_i x_i$, the mixing coefficients $\{\alpha_i\}$ and the 6-byte identifiers of the constituting pure packets are included in the mixture packet to describe the composition of the packet.

In order to reduce overhead and increase efficiency in identifying the composition of a mixture packet, the local network coding method can use several techniques. In general, these techniques use Bloom filters, hash functions, and the IP checksum to verify integrity. Using the checksum to verify integrity may be needed because a hash may yield the same result for two different packets. This is an optional step, used to avoid hash collisions, and does have some minor computational overhead.

One technique is to record hashes of the identifiers of pure packets within the mixture packet that were combined to form the mixture packet. This is done instead of using the original identifiers. Such hashing may result in a false positive due to potential hash collisions. However, a false positive may be detected by the checksum (such as the IP checksum) of the packet. For example, assume that a node receives a packet and it thinks this packet is the mixture of I packets, among which it has I−1 of them. Then the node can try to recover the unknown pure packet and check if the result passes the checksum verification. If the checksum does not agree, the node can simply discard this packet. The IP checksum offers error detection capability, so that if the checksum agrees there can be high confidence in the integrity of the data.

Another technique takes into account that if only XOR operations are allowed, then a packet $\Sigma_i \alpha_i x_i$ is equal to $\Sigma_i x_i$, and only the set $\{x_1, \ldots, x_k\}$ needs to be described. This technique uses a Bloom filter to represent the set $\{x_1, \ldots, x_k\}$. Similar to the hashing scheme described above, the checksum mechanism can detect a false positive. Thus, a false positive does not lead to erroneous results.

The local network coding method also includes a technique for representing the mixing coefficients when they are chosen from a finite field $F=GF(2^w)$. The technique include the number of packets that are being mixed before the Bloom filter. Next, the mixing coefficients are concatenated at the end of the Bloom filter in decreasing order of certain identifiers of the pure packets. For example, one way is to use the bit vector where the packet is hashed. Another possibility is to use the six-byte identifier. For example, if a node N received a packet that is a mixture of I packets and the Bloom filter accepts I−1 pure packets that N possesses, then there are I coefficients listed after the Bloom filter. If there are no false positives, then node N knows the decreasing order of the bit vectors for the I−1 pure packets it has in its possession. Since one of the I coefficients must be associated with the unknown packet, there are I ways to associate the coefficients with the packets. The node can try all these I ways of association. Moreover, after de-mixing, integrity of the de-mixed packet can be checked by verifying the checksum of a de-mixed packet.

In the above checksum verification process, two conditions must hold for an association to be valid. First, the identifier of the unknown packet must admit the corresponding ordering. Second, the checksum must succeed. If the six bytes of IP header are used as identifier, then for each association the six bytes can be recovered first and the identifier of the unknown packet must admit the corresponding ordering. With the aforementioned parameter setting, this scheme requires three bits for the number of packets being mixed, eight bytes for the Bloom filter, and at most four bytes for the coefficients.

VI. Mixing at a Wireless Access Point

The local network coding method can be applied specifically at a wireless access point to improve the performance in a wireless local area network (WLAN). The optimizations described herein can be customized to a particular WLAN. In some embodiments implemented in a WLAN, the TCP data and acknowledgement packets are combined, even for unidirectional flows. Since TCP is widely used for many applications, the benefit could be significant.

By way of example, consider a file transfer or disk backup application that transfers large amounts of data between machines in a wireless home or wireless office setting. In other embodiments, the local network coding method could be customized to optimize bidirectional communication between gaming devices, such as may be common on a home WLAN. In still other embodiments, the method could be customized to optimize bidirectional communication between a media center computer and a wireless set-top box.

This could includes sending media frames in one direction and control messages in an opposite direction.

Figure 5:
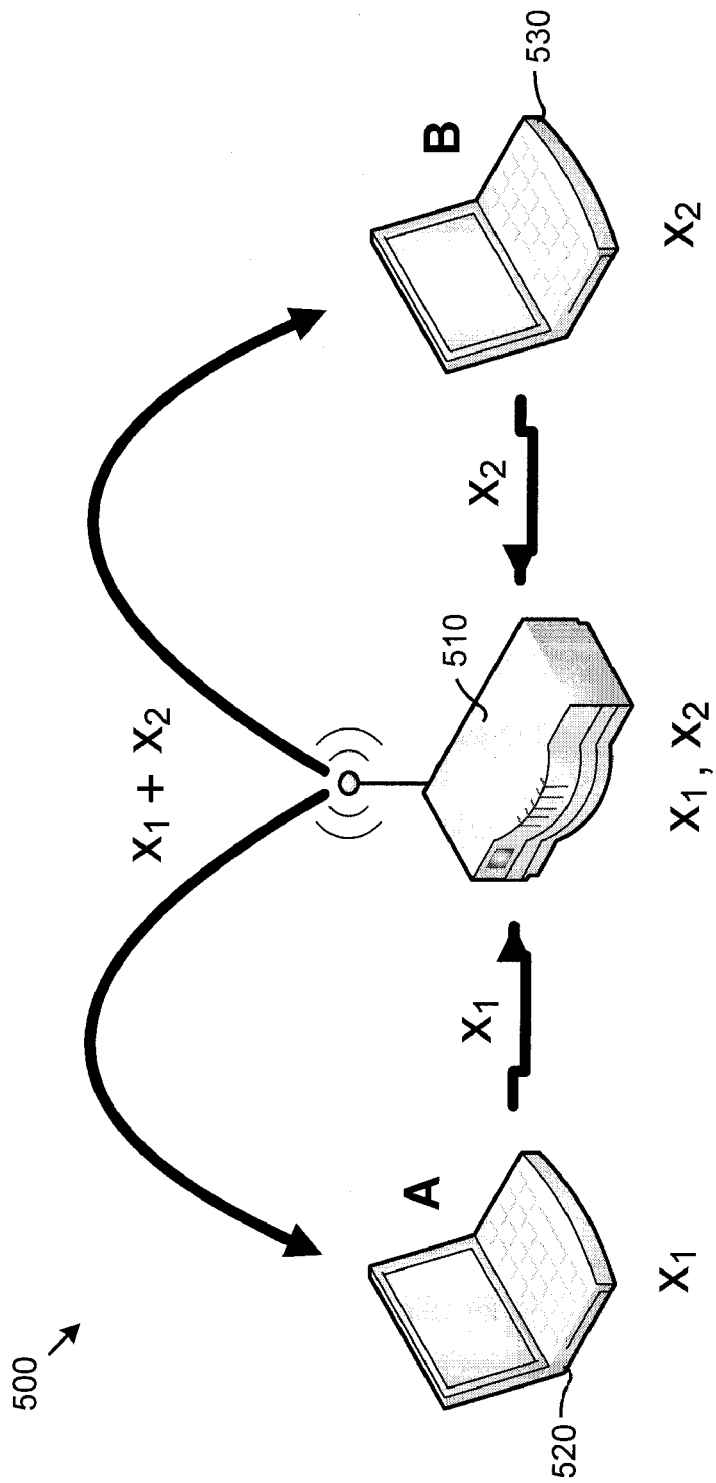
FIG. 5 illustrates an exemplary implementation of the local network coding method applied at a wireless access point to in a wireless local area network (WLAN).

FIG. 5 illustrates an exemplary implementation of the local network coding method applied at a wireless access point to in a WLAN 500. More specifically, FIG. 5 includes a wireless access point 510 in communication with a node A (which is a first notebook computer 520) and a node B (which is a second notebook computer 530). FIG. 5 illustrates how to use the local network coding method at the wireless access point 510 to benefit bidirectional communications.

The special properties of this configuration render it possible to reduce the implementation complexities. For a WLAN operating in the infrastructure mode, all communications must go through the access point. In the example shown in FIG. 5, the local network coding method can be customized for this configuration. First, the client nodes 520, 530 do not need to mix packets. Second, the exclusion of unnecessary reports can be customized. For example, if node A 520 overheard a pure packet that was sent to the access point 510 and furthermore node A 520 has heard the access point transmitting a packet involving the packet, then node A 520 can infer that the pure packet is less likely to be mixed again at the access point. Thus, such a packet can be excluded from the announcements. In addition, the access point 510 does not need to announce its received pure packets since they have already been acknowledged at the MAC layer. Some embodiments include a simplification that uses the aforementioned passive inference only, rather than using explicit announcements of data availability, to identify mixing opportunities. This limits the mixing opportunities to the case of packet exchanges but reduces the implementation complexity.

VII. Exemplary Operating Environment

The local network coding framework and method is designed to operate in a computing environment. The following discussion is intended to provide a brief, general description of a suitable computing environment in which the local network coding framework and method may be implemented.

Figure 6:
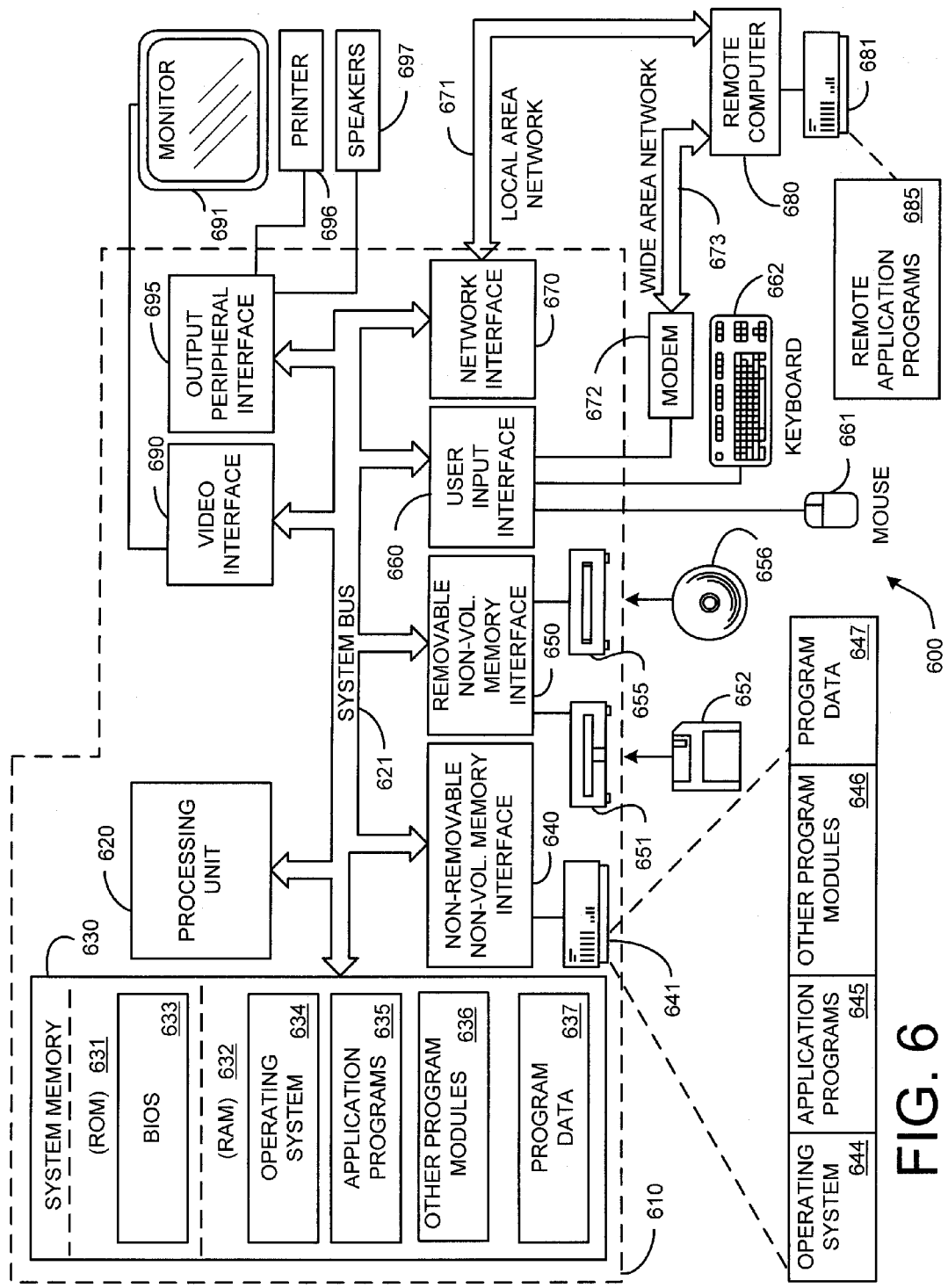
FIG. 6 illustrates an example of a suitable computing system environment in which the local network coding framework and method may be implemented.

FIG. 6 illustrates an example of a suitable computing system environment in which the local network coding framework and method may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment.

The local network coding framework and method is operational with numerous other general purpose or special purpose computing system environments or configurations. Examples of well known computing systems, environments, and/or configurations that may be suitable for use with the local network coding framework and method include, but are not limited to, personal computers, server computers, handheld, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The local network coding framework and method may be described in the general context of computer-executable instructions, such as program modules, being executed by a computer. Generally, program modules include routines, programs, objects, components, data structures, etc., that perform particular tasks or implement particular abstract data types. The local network coding framework and method may also be practiced in distributed computing environments where tasks are performed by remote processing devices that are linked through a communications network. In a distributed computing environment, program modules may be located in both local and remote computer storage media including memory storage devices. With reference to FIG. 6, an exemplary system for the local network coding framework and method includes a general-purpose computing device in the form of a computer 610.

Components of the computer 610 may include, but are not limited to, a processing unit 620 (such as a central processing unit, CPU), a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer readable media. Computer readable media can be any available media that can be accessed by the computer 610 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 610. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within the computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 620 through a user input interface 660 that is coupled to the system bus 621, but may be connected by other interface and bus structures, such as, for example, a parallel port, game port or a universal serial bus (USB). A monitor 691 or other type of display device is also connected to the system bus 621 via an interface, such as a video interface 690. In addition to the monitor, computers may also include other peripheral output devices such as speakers 697 and printer 696, which may be connected through an output peripheral interface 695.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for local network coding in a wireless network, comprising:
   using a Bloom filter to exchange data availability between nodes on the wireless network;
   receiving data from other nodes on the wireless network;
   optimizing the local network coding at a wireless node in the wireless network by optimizing a mixing of pure packets to form mixture packets based on the data availability; and
   processing the received data based on the data availability to generate output data from the mixture packets for transmission on the wireless network.

2. The method of claim 1, further comprising having each node on the wireless network compose and transmit a data availability announcement that is a Bloom filter, wherein the data availability announcement announces to neighbors the packets the node currently possesses.

3. The method of claim 2, further comprising:
   defining a validity period for each data availability announcement such that each node can have a collection of Bloom filters sent by its neighbors that have not expired; and
   inferring from the collection of Bloom filters and the validity period whether a node that sent the Bloom filter has a packet in its possession.

4. The method of claim 2, further comprising excluding pure packets from the data availability announcement when at least one of the following occurs: (a) if a current node is not an intended receiver of a pure packet and if it is inferred that the pure packet is less likely to be piggybacked; (b) if the current node is the intended receiver of a pure packet and the packet has already been acknowledged by the media access control (MAC) layer.

5. The method of claim 1, further comprising using a separate acknowledgment buffer that contains pure packets that have been transmitted but have not been acknowledged as received by other nodes, wherein a mixture packet includes a packet that has been created by a mixing operation, and wherein a pure packet is a packet that was not generated by a mixing operation.

6. The method of claim 5, further comprising:
determining that an acknowledgement for a packet in the separate acknowledgment buffer has not been received within a certain acknowledgement time period; and
retransmitting the packet.

7. The method of claim 1, further comprising:
optimizing mixing of pure packets to form mixture packets based on the data availability; and
generating the output data from the mixture packets for transmission.

8. The method of claim 1, further comprising:
selecting a set of pure packets to be mixed;
selecting a set of intended receiver nodes; and
determining mixing coefficients.

9. The method of claim 8, further comprising identifying a set of candidate pure packets to facilitate an in-order delivery of packets in the output data belonging to the same transmission control protocol (TCP) flow, wherein a pure packet is considered a candidate packet if there does not exist another pending outgoing packet that is an earlier packet in time in the same TCP flow as the pure packet.

10. The method of claim 8, further comprising:
(a) enumerating a plurality of sets of intended receiver nodes;
(b) optimizing a formation of a single mixture packet from selected pure packets for each set of intended receiver nodes to find an optimal mixture packet; and
(c) retaining an optimal mixture packet for a given set of intended receiver nodes.

11. The method of claim 10, further comprising:
selecting one of the plurality of sets of intended receiver nodes;
selecting a single packet for each receiver node in the set of intended receiver nodes having a largest per-packet utility function; and
taking a union of each single packet to determine the set of pure packets to be mixed.

12. The method of claim 10, further comprising:
selecting one of the plurality of sets of intended receiver nodes;
starting with an initial set of pure packets to be mixed;
adding a pure packet to the initial set whose addition leads to a largest increase of a function; and
continuing adding pure packets whose addition leads to a largest increase of a function until the function is no longer increasing.

13. The method of claim 10, further comprising:
selecting one of the plurality of sets of intended receiver nodes;
starting with an initial set of pure packets to be mixed;
removing a pure packet from the initial set whose removal leads to a largest increase of a function; and
continuing removing pure packets whose removal leads to a largest increase of a function until the function is no longer increasing.

14. The method of claim 8, wherein determining the mixing coefficients further comprises at least one of:
(a) setting a mixing coefficient for a packet to one if the packet is wanted by only one receiver node in the set of intended receiver nodes;
(b) setting the mixing coefficient for the packet to a randomly-chosen element of nonzero elements of a finite field if the packet is wanted by more than one receiver node in the set of intended receiver nodes.

15. The method of claim 1, further comprising performing mixing of pure packets at a wireless access point on the wireless network to generate mixture packets that are part of the output data.

16. The method of claim 1, further comprising recording hashes of identifiers of the pure packets that were combined to form the mixture packets to represent a composition of the mixture packets.

17. The method of claim 1, further comprising recording a Bloom filter of the pure packets that were combined to form the mixture packets to represent a composition of the mixture packets.

18. A computer-implement process for performing local network coding on a wireless network, comprising:
using a Bloom filter to exchange data availability between nodes on the wireless network;
optimizing the local network coding by mixing of pure packets based on the data availability to form output mixture packets for transmission on the wireless network, the optimized mixing occurring at a wireless access point on the wireless network and further comprising:
examining each possible combination of receivers on the wireless network;
using an optimization process to select an optimal combination of receivers;
optimizing a formation of a single mixture packet for each one of the optimal combination of receivers by selecting pure packets to be mixed and included in the single mixture packet to obtain the mixture packets; and
using a separate acknowledgement buffer that contains packets that have been transmitted but have not been acknowledged to provide reliable delivery of the packets.

19. The computer-implemented process of claim 18, further comprising:
representing a linear mixture of a packet over a finite field by a number of packets being mixed, a Bloom filter of the packets being mixed, and mixing coefficients that are arranged in some order based on the packets; and
verifying a checksum of a de-mixed packet after delivery to check an integrity of the de-mixed packet.

* * * * *